3,847,852
OUTDOOR DEGRADABLE HYDROCARBON PLASTIC

Roy A. White, Somers, Conn., and Stanley A. Margosiak, Springfield, Mass., assignors to De Bell & Richardson, Inc., Enfield, Conn.
No Drawing. Filed Aug. 23, 1972, Ser. No. 282,946
Int. Cl. C08f 45/04, 45/14
U.S. Cl. 260—23 H
6 Claims

ABSTRACT OF THE DISCLOSURE

Thin hydrocarbon plastic articles are made more easily and readily degradable by incorporating within the hydrocarbon resin, prior to formation of the article, 0.1 to 15 parts by weight of a very finely divided additive which promotes U.V. degradation of the resin, per 100 parts by weight of the resin. The additive is preferably silica or a fatty acid metal salt.

FIELD OF INVENTION

The present invention relates to plastic materials which more easily degrade outdoors, and, more particularly, to outdoor degradable hydrocarbon plastics substantially of the repeating formula —$CH_2CHR$—, wherein "R" is —$CH_3$, —$C_2H_5$, —$C_3H_7$, or —$C_4H_9$.

BACKGROUND

In the present age of one-use, throw-away plastic articles, primarily those used in packaging, serious problems of littering and solids pollution have occurred due to the careless discarding after usage of these plastic articles. Because such plastics do not easily or quickly degrade they tend to accumulate besides the roadways, at picnic facilities, in parks and in waterways where they remain for years prior to degradation or until removal.

It has been proposed to modify the plastics so that they will more easily degrade, but the proposals so far made have not provided an answer to the problem. It has been suggested that special interpolymers, which are more easily degradable, used for one-use plastic articles, but these polymers have either been too expensive, lacking in the requisite physical properties and/or insufficiently improved in the desired property of providing quick degradation. It has also been proposed to use additives with the plastic to increase the speed of degradation, but these additives have been too expensive, have been toxic—thereby eliminating usage with food products—they have had a tendency to degrade the plastic indoors as well as outdoors, they have adversely affected the desirable polymer properties such as strength or transparency and/or they have interfered with conventional trash disposal techniques.

SUMMARY

It is, accordingly, an object of the present invention to overcome the deficiencies of the prior art, such as indicated above.

It is another objective to provide for the increased rate of degradation of plastic articles disposed outdoors.

The principal objective of the invention is to enable plastics such as polypropylene to degrade if carelessly discarded out of doors in picnic areas, along the roadside, in otherwise scenic areas, etc.

Another object is to provide an inexpensive plastic which degrades more readily and which does not introduce dangerous toxicants into the environment.

It is another principal objective to enable ready deterioration of hydrocarbon plastic where exposed to sunlight during landfill operations wherein the trash may be exposed to sunlight for some time.

It is another principal objective to provide a composition for use as a self-disintegrating mulch covering.

These and other objectives are met by incorporating a suitable additive into the polymer rather than by the use of special copolymers, i.e., incorporating promotors comprising certain high surface area, mostly inorganic, particles such as silica into —$CH_2$—CHR— type plastics such as polypropylene and copolymers, polybutene, and polypentene.

The high surface areas referred to must be the exterior surface areas of the particles. Surface in the interior of a particle, such as due to internal pores, does not contact the hydrocarbon plastic in the presence of U.V.; hence interior area is not germane to consideration for the purposes of this invention. As a guide, 0.01$\mu$ spheres of 2.5 gms./cc. density possess a surface area of 240 square meters per gram (hereinafter m.$^2$/gm.), 0.1 micron spheres—24 m.$^2$/gm., and 3.4$\mu$ spheres—0.7 m.$^2$/gm. A wrinkled surface would, of course, have a higher surface area.

By an outdoor degradable polymer, what is meant is a fabricated plastic article of less than 0.08 inch thickness, e.g., film, containers, lids, packaging, etc., which, when discarded out of doors and with reasonable exposure to direct or reflected sunlight, will in due course embrittle and hence eventually disintegrate into powder. On the other hand, the fabricated articles do not embrittle indoors, before being discarded out of doors. Further, the additives to the plastic, for example, polypropylene plastic, do not render the plastic substantially less transparent or discolor the plastic or embrittle or otherwise deteriorate the plastic properties. Further, the preferred additives are nontoxic and pemit food packaging. The additives do not interfere in any way with conventional disposal techniques for trash—e.g., landfill, burning, etc.

The exact mechanism of the degradation promotion by the high surface area additive material used in the present invention is not known with certainty. We suspect, but do not wish to be limited by the theory, that the silicas, silicate, and metal oxides form weak hydroperoxides in the presence of the combination of ultraviolet, oxygen, and possibly small amounts of water—i.e., SiOH→SiOOH; to support this theory it has been found that heating the silica to high temperatures before its incorporation into the plastic diminishes the effectiveness of the silica—probably through loss of hydroxyl: SiOH→SiOSi. However, another possibility is that high available surface areas exert a catalytic effect on oxidation merely by virtue of the high surface area available for adsorption of oxygen and the U.V. catalyzes further reaction with the plastic.

DETAILED DESCRIPTION OF EMBODIMENTS

The plastics which are modified in accordance with the present invention encompass hydrocarbon polymers containing 65% or more of the following polymerized monomeric units:

$CH_2$=$CHCH_3$; $CH_2$=$CHCH_2CH_3$; $CH_2$=$C(CH_3)_2$;
$CH_2$=$CHCH_2C(CH_3)_2$; $CH_2$=$CHCH_2CH_2CH_3$;
$CH_2$=$CHCH_2CH_2CH_3$

The remaining 35% or less may be ethylene. Thus, the polymers may be homopolymers of any of the above monomers, they may be interpolymers of two or more of these monomers, or they may be interpolymers of one or more of these monomers with up to 35% ethylene. More than 35% ethylene reduces the polymer side groups sufficiently such that the ability of the additive to promote degradation is substantially reduced. Presence of other monomers such as styrene, which screens U.V., is not favored. Preferred compositions are 15% or less ethylene.

In combination with the aforementioned hydrocarbon resin is utilized 1–15 parts by weight per hundred parts by weight of resin (hereinafter phr.) of a high surface area ultraviolet sensitizing or promoting agent. Experience dictates that the surface area of the added agent must be over 10 m.²/100 grams of hydrocarbon resin. Suitable agents are:

1. Oxides or hydroxides of silicon, tin, lead, aluminum, bismuth, antimony and magnesium; also fatty or rosin acid dispersed oxides of these elements. Silicas generally yield a composition with similar appearance to the original unfilled resin since they have a close refractive index match and, accordingly, the silicas are among the preferred agents.
2. Silicates of Group IIA of the Periodic Table, also aluminum, bismuth, antimony, tin, and lead. Also silica aluminates of Group IA,
3. Sulfates of barium, strontium, calcium, and lead. Also basic sulfates of bismuth and antimony.
4. Carbonates of Group IIA, aluminum, tin, lead, bismuth and antimony.
5. Phosphates of Group II, aluminum, tin, lead, bismuth and antimony.
6. Fatty acid metal salts. The metals comprise Al, Sn, Pb, Sb, Bi and the Groups IIA and IIB metals. The fatty moiety consists of hydroxystearic acid, oleic acid and

$(CH_2)_3$—$(CH_2)_{1-18}$ H. Examples of these fatty acid metal salts are calcium stearate, basic zinc stearate, cadmium stearate, aluminum monostearate, aluminum distearate, aluminum tristearate, aluminum trioleate, aluminum octoate, dibasic lead stearate, bismuth palmitate, tin laurate, magnesium laurate, cadmium palmitate, etc. When mixed with the molten resin or milled with the softened resin, these fatty acid metal salts, which may be effectively used in an amount as little as 0.1 phr., become colloidally dispersed therein, i.e., of particle size as small as 0.0005–0.01 microns. The fatty acid metal salts are also among the preferred additives.

The high surface inorganic may be formed by being ground or precipitated to form a very fine particle. In the case of silica, arc processes and fuming from silicon chloride are feasible. By and large, high surface inorganics useful to this invention are preferably in the range of $0.05\mu$ particle size rather than in the $0.5\mu$ pigment and general-purpose filler range. The desirable external surface area range is over 2.5 m.²/gram, preferably over 100 m.²/gram. Inorganics with a lower degree of surface, i.e., greater particle size, may be used, but of course a higher quantity must be employed to reach the 10 m.² of surface area per 100 grams of hydrocarbon resin level. Thus, as an upper extreme spherical particles as great as $3.4\mu$, providing an external surface area of as low as 0.7 m.²/gm., could be used at the maximum rate of 15 phr. Higher quantities of inorganics are sometimes undesirable in that they may adversely affect the physical properties of the final product, particularly transparency; in this regard sufficient transparency must be retained to permit U.V. to reach the interior of the article.

Materials have widely varying refractive indices (R.I.) ranging from 1.5 for some silicas to 2.55 for $TiO_2$. The higher refractive index materials having an R.I. of over 1.76 tend to act as pigments, blocking light from the interior of the compounded degradable plastic. Where the refractive index is high, particle sizes below the wave length of light and the pigment range, i.e., 0.3, have less tendency to obstruct light and may be used, but such high refractive index materials are, in general, less desirable than silica. Since the higher refractive index materials block out light, they must be used at lower levels than 15 phr. if the article thickness exceeds 0.002–0.005″ thickness. Therefore the higher refractive index materials must be of a finer particle size not only to minimize the blockage of U.V. rays, but also to achieve more of the necessary surface area/gram. It has now been empirically determined that the minimum surface area suitable for this invention is:

Minimum area A in m.²/g=$10^{2.44}$ (refractive index−1.564)

To illustrate, if the refractive index is 1.564, the minimum possible surface area is $10^0$=1 m.²/g. At least 10 m.² or 10 grams of such material, having a $2.4\mu$ particle size if spherical, would be needed per 100 grams of resin to achieve a low but reasonable outdoor degradability. Of course, 2 grams of a 200 m.²/gram material would achieve more rapid results. If the refractive index were 2.1, then $10^{2.44\ (2.1-1.564)}$=20 m.²/gm., and 1–4 grams of such material/100 g. resin would provide 20–80 m.². This exceeds the minimum of 10 m.²/100 gms. of resin while still using a minimal amount of light blocking high refractive index material.

With higher refractive index materials, a further complication arises if a plastic article to be degraded exceeds certain thickness. In general, the maximum thickness of the plastic article should not exceed about 80 mils; otherwise, depending on the additive and its quantity, the U.V. transparency is reduced to an undesirable level.

Other things being equal, it has been determined that the maximum amount of U.V. degrading agent in the hydrocarbon plastic should be 15 phr. If the U.V. degrading agent is of high refractive index, we have found the following formula to hold:

Maximum U.V. degrading agent content (phr.)
$$=15-17.1\ (\text{refractive index}-1.7)\ \frac{\text{thickness}}{0.020}$$

where thickness is expressed as a fraction (thousandths) of one inch.

To illustrate, if refractive index is 1.7 or less, maximum U.V. degrading agent would be 15 phr. If the refractive index were 2.1 at 20 mils specimen thickness, Maximum quantity of additive
$$=15-17.1\ (2.1-1.7)\ \frac{0.020}{0.020}=8.2\ \text{phr.}$$

The present invention resulted from chance observation that finely-divided silica diminished the U.V. stability of polypropylene. Quite surprisingly, it was found that *small quantities* of certain silicas would more than diminish stability to U.V. aging—complete disintegration would eventually be caused by the additives. Accordingly, to investigate this phenomenon, polypropylene [1] stock was milled for 5 minutes at 350° F. in combination with the inorganic materials investigated, on a two-roll rubber mill, sheeted off, and press molded at 400° F. to 0.020 inch thickness. A 1″ x 2″ specimen was then placed toward the periphery of a rotating table (33 r.p.m.) while being radiated by a GE RS-4 ultraviolet bulb 5 inches above the specimens. A 150-watt bulb to maintain a 55° C. temperature was also employed (apparatus is similar to ASTM D 620). The hours required to embrittle the specimen (breaks when folded in half) were noted. Results are recorded in Table 1.

---

[1] Rexall El Rexene 23-S-2 copolymer; density 0.895 g./cc.; substantially phr., melt index 2 g./10 min. by ASTM D 1238–230° C.

TABLE 1.—EFFECT OF ADDITIVES ON POLYPROPYLENE DEGRADATION

| Example | Additive | Surface area (BET) Square meters/gram additive | Surface area (BET) Per 100 g. resin, m.² | Method of manufacture | Phr. additive | RS-4 hours to embrittlement | Additive refractive index, 5,890 A. |
|---|---|---|---|---|---|---|---|
| 1 | DeGussa Ultrasil VN-3 silica | 252 | 900 | Precipitated | 4 | 48 | 1.46 |
| 2 | do | 225 | 450 | do | 2 | 48 | 1.46 |
| 3 | do | 225 | 225 | do | 1 | 96 | 1.46 |
| 4 | Pittsburgh Plate Glass HiSil 233, silica | 150 | 600 | do | 4 | 48 | 1.46 |
| 5 | Pittsburgh Plate Glass Arc Silica 800, silica | 185 | 740 | Arc | 4 | 48-60 | 1.46 |
| 6 | Cabot Cab-O-Sil MS-7 silica | 200 | 800 | Fumed | 4 | 60 | 1.46 |
| 7 | Huber Zeocil 100 silica | 135 | 540 | Precipitated | 4 | 60 | 1.46 |
| 8 | DeGussa Aerosil R972 silica ¹ | 120 | 480 | Arc | 4 | 120 | 1.46 |
| 9 | Johns-Manville Celite Snow Floss (silica) | 2.5 | 10 | (²) | 4 | 120 | |
| 10 | Malvern Minerals 207A silica | 0.7 | 2.8 | Mined | 4 | 144 | 1.46 |
| 10A | do | 0.7 | 10 | do | 15 | 72 | |
| 11 | Johns-Manville Microcel C (calcium silicate) | 175 | 700 | Precipitated | 4 | 48 | 1.61 |
| 12 | Thiele Kaolin EG-21 clay (aluminum silicate) | | | (³) | 4 | 72 | 1.56 |
| 13 | Huber Arogen 500 (sodium silico aluminate) | 220 | 880 | Precipitated | 4 | 72 | |
| 14 | Pittsburgh Plate Glass Silene EF (calcium silicate) | 90 | 360 | do | 4 | 72 | 1.61 |
| 15 | Sierra Talc Mistron ZSC talc | 34 | 136 | Mined | 4 | 96 | 1.59 |
| 16 | Floridin Co. Min-U-Gel 200 (attapulgite clay) | 120 | 480 | do | 4 | 120 | |
| 17 | Engelhard Minerals Attagel 40 (attapulgite clay) | 210 | 840 | do | 4 | 120 | |
| 18 | Cabot Cab-O-lite F-1 Wollastonite (CaSiO₃) | | | do | 10 | 60 | 1.61 |
| 19 | Cabot Alon (alumina) | 100 | 1,000 | Fumed | 10 | 96 | 1.70 |
| 20 | do | 100 | 400 | do | 4 | 96 | 1.70 |
| 21 | National Lead Co. (lead chlorosilicate) | 2.4 | 9.6 | Precipitated | 4 | 240 | 1.96 |
| 22 | National Lead Tribase (tribasic lead sulfate) | 2.5 | 10 | do | 4 | 240 | 1.88 |
| 23 | Merck Maglite D (magnesium oxide) | 94 | 376 | do | 4 | 96 | 1.74 |
| 24 | Alcoa Hydral 710S (Al₂O₃) | 7 | 28 | | 4 | 108 | 1.57 |
| 25 | Metal & Thermit Thermoguard S (Sb₂O₃) | 4 | 16 | | 10 | 288 | 2.1 |
| 26 | Metal & Thermit Thermoguard FR (Sb₂O₃) | 25 | 100 | | 4 | 48 | 2.1 |
| 27 | Fisher Lab T-147 tin oxide | 4 | 16 | | 10 | 268 | 2.0 |
| 28 | Diamond Alkali Surfex MM (CaCO₃) | 5 | 20 | Precipitated | 4 | 72 | 1.66 |
| 29 | Diamond Alkali Super Multifex (CaCO₃) | 7 | 60 | do | 4 | 72 | 1.66 |
| 30 | Diamond Alkali Kalite (CaCO₃) | 7 | 28 | do | 4 | 96 | 1.66 |
| 31 | Chemetron Blanc Fixe (BaSO₄) | 16 | 160 | do | 10 | 96 | 1.64 |
| 32 | Cabot Cab-O-Ti (TiO₂, 85% anatase) | 60 | 240 | Fumed | 4 | 150 | 2.55 |
| 33 | Stauffer Tricalcium Phosphate NF | 10 | 40 | Precipitated | 4 | 72 | 1.58 |
| 34 | Johns-Manville SG glass fiber | 0.5 | 2 | | 4 | 144 | |
| 35 | FMC Avibest (dispersed asbestos) | 68 | 272 | | 4 | 144 | |
| 36 | DuPont Fybex (potassium titanate) | 11 | 44 | | 4 | 144 | 2.50 |
| 37 | None (control) | | | | | 144 | |

¹ Hydrophobic silica; surface largely coated with —CH₃.
² Diatomaceous earth.
³ Air-floated/fine particle size clay fraction, 86% less than 2.

Thus it would appear that high surface area silicon dioxide and particularly high —SiOH content, precipitated silicon dioxide, is very effective for the purpose at hand. Silicates, and relatively water-insoluble metal oxides, can also be employed and constitute an improvement over the control (Example #37)—144 hr. to embrittlement. Pound for pound, or on an equivalent surface area basis, silica materials appear to be more efficient than the metal oxides, sulfates, carbonates and phosphates.

With regard to the effect of surface hydroxyls, the Ultrasil, Hi-Sil, and CAB-O-Sil type silicas of Table 1 have a population of 3–4 hydroxyls per square millimicron, while Aerosil R972 (Example 8) has only a very low free hydroxyl content. A content of 1 phr. additive would appear to be minimal (Example 3). This is probably due to the fact that the population density of the dispersed U.V. degradation promotor cannot be such that considerable volumes of resin are not in immediate proximity to the promotor surface area. The minimum surface of the U.V. degradation promoting agent would appear from Example 9 and Example 10A to be 10 square meters/100 grams of resin.

In actual out of doors aging (45° with horizontal, facing due south) in the Connecticut area, the composition of Example 5 was found to embrittle in one month (summer) and five months in winter. By contrast, the control—Rexene (No. 37)—was found to embrittle after 12 months out of doors, approximately a three-fold improvement. The compositions of Examples 1 and 2 embrittled in less than one month out of doors during another summer season. The compositions of Examples 8, 9, 12 and 20 embrittled in one summer month and the composition of Example 28 embrittled before two months had expired. The degradation proceeds further than "embrittlement" as continued outdoor aging takes place.

The composition of Example 5 in 3 summer months outdoors degraded to the point where the material had negligible strength and could be disintegrated by mashing lightly between the thumb and forefinger or by placing in a bird cage for one week. The control, Example 37, reached this point after 13–15 months out of doors in Connecticut. The composition of Example 1 reached this point after 1.5–2 months outdoors during the summer.

Experiments were undertaken to determine loss in elongation and tensile strength during U.V. aging. Results were as follows:

TABLE 2

Effect of U.V. radiation and silica on tensile and elongation of polypropylene

| Ex. | Additive | Tensile (p.s.i.)/elongation (percent) at designated hours of RS-4 radiation | | | | |
|---|---|---|---|---|---|---|
| | | 0 hrs. | 56 hrs. | 80 hrs. | 104 hrs. | 168 hrs. |
| 5 | 4 phr. Arc silica 800. | 4,640/660 | 2,730/2 | | 1,110/1 | 390/0.3 |
| 37 | None | 5,340/780 | 2,780/840 | 3,360/10 | 2,310/3 | 1,240/2 |

Thus loss in tensile and elongation continue after the brittle point (2–3% elongation), with degradation progressing much more rapidly if the U.V. degradation promotor is present.

Other hydrocarbon polymers prepared from $CH_2=CHR$ materials were evaluated with the following results:

TABLE 3

Effect of silica (4 phr. Ultrasil VN-3) on RS-4 degradation

| Ex. | Resin | RS-4 hours to embrittlement | |
|---|---|---|---|
| | | With silica | Without silica |
| 38 | Eastman Polyallomer 5 B2D ethylene/propylene block polymer.¹ | 96 | 168 |
| 39 | Hercules ProFax 6523 polypropylene homopolymer.² | 80 | 144 |
| 40 | Mobil Chemical polybutene homopolymer ³ | 72 | 96 |
| 41 | ICI TPX-Rt poly-2-methyl pentene homopolymer.⁴ | 80 | 144 |

¹ Refractive index 1.492; density, 0.899; melt index 2.5 g./10 min. (ASTM D1238, 230° C.).
² Melt index 4 g./10 min. (ASTM D1238, 230° C.).
³ Melt index 4 g./10 min. (190° C.); density, 0.912 g./cc.
⁴ Crystalline melting point, 240° C.; Vicat softening point, 179° C.

In a one-month summer outdoor period, the compositions of Examples 39 and 40 with 4 p.h.r. embrittled, while the controls without silica were not at all adversely affected. The compositions of Examples 38 and 41 embrittled in 6 weeks.

Samples of the Example 5 composition hung indoors in a fluorescent lighted laboratory for two and one-half years did not degrade in any observable manner. By contrast, certain compositions not covered by the present invention, e.g., the composition Rexene 23–S–2 with 0.05 phr. cobalt or cerium (as naphthenate) did degrade in three months out of doors but also degraded indoors, even when stored in a dark cabinet. Thus, one of the advantages of the present compositions is that they do not degrade indoors, but do degrade outdoors.

On the assumption that a molecular size alumina of about 5 A.; e.g., aluminum monostearate, would have half of its surface exposed, and if the monostearate were molecularly dispersed, one would expect about 2,000 m.²/gm. of alumina surface of 320 m.²/gm. of aluminum monostearate. Further, the spacing between alumina surfaces would be smaller than with "Alon" enabling lower minimum limits of $Al_2O_3$ content. When indeed aluminum monostearate was found to be effective, other fatty metal salts were screened. These further examples were carried out exactly the same as Examples 1–37 using the same polymer and the same conditions. Results are set forth in Table IV.

TABLE IV

Fatty metal salts

| Ex. | Additive | Phr. | RS-4, hours to embrittlement |
|---|---|---|---|
| 42 | Nuodex calcium stearate | 4 | 48 |
| 43 | Witco T-1 sodium stearate | 4 | 120 |
| 44 | Nuodex DLG-20 zinc stearate (basic) | 4 | 96 |
| 45 | Witco cadmium stearate | 4 | 32 |
| 46 | Synpro #505 aluminum monostearate | 4 | 48 |
| 47 | Synpro #505 aluminum monostearate | 1 | 48 |
| 48 | Synpro #505 aluminum monostearate | 0.5 | 48 |
| 49 | Synpro #209-B aluminum distearate | 4 | 32 |
| 50 | Nuodex Low Gel 2 aluminum tristearate | 4 | 32 |
| 51 | Aluminum trioleate | 1 | 32 |
| 52 | Witco aluminum octoate | 4 | 32 |
| 53 | National Lead DS-207 dibasic lead stearate | 3 | 32 |
| 54 | Aluminum octoate | 0.5 | 72 |
| 55 | do | 0.2 | 72 |
| 56 | do | 0.1 | 72 |
| 57 | Ultrasil VN-3 silica and aluminum octoate | (¹) | 48 |
| 58 | Nopco aluminum salt of 12-hydroxystearic acid | 0.5 | 72 |

¹ 2 silica, 1 Al octoate.

Hence, it would appear that other fatty moities are suitable with aluminum and that the cations found previously to function as oxides and silicates also function as the fatty derivative. It is our theory, although we do not wish to be so limited, that di and tri stearates or other fatty metal salts disperse more efficiently than monostearates and hydrolyze or dissociate somewhat to expose metal hydroxide or oxide.

That these fatty acid salts effectively promote hydrocarbon polymer degradation is very surprising in view of the fact that some fatty acid salts are known as light stabilizers for vinyl chloride resins; thus cadmium stearates and lead stearate have been suggested as light stabilizers, and dibutyl tin dilaurate, dibasic lead phthalate, dibutyl tin maleate and barium ricinoleate have been suggested as stabilizers for vinyl chloride resin. Similarly basic lead carbonate, basic lead sulfate and basic silicate white lead have been suggested as PVC heat and light stabilizers.

Example 57 is particularly interesting in that it shows that certain of the additives may be mixed without their interfering wtih each other. In one example, lead stearate was mixed with silica and this inhibited degradation whereas each operates in the absence of the other. Accordingly, of the fatty acid salts useful in the present invention, only those of Periodic Table Groups IIA and IIB and aluminum can be mixed with the particulate additives without a reduction in degradative activity. Accordingly, mixture of the particulate additives with the fatty acid salts is not favored, with the exceptions noted above.

With regard to the additions of other materials, in general they are not favored. Thus, while pigments may be incorporated into the degradable composition, the actual effect of the various pigments is empirical and dependent on the quantity of pigment present and the thickness of the disposal item to be discarded. Certainly the light and U.V. screening properties of pigments are undesirable for the purpose at hand. Thin films, i.e. 0.005" thick, readily permit the use of 1–2% pigment. Anatase is preferable to rutile for the purpose at hand. Materials which yield quantities of metals having an atomic number of 22–29 are generally undesirable; and if used, a retarding action on degradation will usually occur.

Antioxidants and U.V. screening agents and fine particle carbon can be added to the formulation, but these materials tend to retard the outdoor degradation rate. This would be of advantage only if it were desired to "time" the onset of degradation, e.g. to provide special grades of mulch film.

Small amounts, i.e., up to about 30–35% based on the total resin content, of other resins, e.g. substantially substituted hydrocarbon polymers, may be blended with the basic hydrocarbon polymer. These include low and high density polyethylenes, EVA copolymer, and butyl rubber. Of course, mixtures or blends of the basic hydrocarbon polymers may also be used in place of a single basic hydrocarbon polymer. The net final —CHCHR— content must be 65% or more.

It is to be understood that the invention is not limited to the embodiments disclosed which are illustratively offered and that modifications may be made without departing from the invention.

What is claimed is:

1. An ultraviolet degradable plastic article consisting essentially of:
   (a) 100 parts by weight of hydrocarbon resin consisting of at least 65% of the monomers propylene, butylene, pentene or hexene content, said resin being a homopolymer of one of said monomers, an interpolymer of two or more of said monomers, or an interpolymer of one or more of said monomers with up to 35% ethylene;
   (b) from a minimum in the range of 0.1 to 1 part to a maximum in the range of 8–15 parts by weight of a U.V. sensitizer-promoter selected from the group consisting of
      (1) Oxides of the elements silicon, tin, lead, aluminum, bismuth, antimony and magnesium; and oxides of said elements dispersed by fatty or rosin acid;
      (2) Silicates of Group IIA of the Periodic Table; silicates of aluminum, bismuth, antimony, tin, and lead; and silico aluminates of Group IA;
      (3) Sulfates of barium, strontinum, calcium and lead; and basic sulfates of bismuth and antimony;
      (4) Carbonates of Group IIA; and carbonates of aluminum, tin, lead, bismuth and antimony;
      (5) Phosphates of Group IIA; and phosphates of aluminum, tin, lead, bismuth and antimony;
      (6) Fatty acid metal salts wherein the metal is aluminum, tin, lead, antimony, bismuth or a metal of Group IIA or Group IIB of the Periodic Table, and the fatty moiety is oleic acid or an acid moiety of the formula

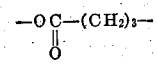

$(CH_2)_{1-18}H$; or hydroxystearic acid;

said minimum quantity being 1 part by weight for said groups (1) to (5) and sufficient to provide a surface area per 100 grams of resin of at least 10 m.², and being 0.1 parts by weight for said group (6);
said maximum quantity of group (6) being 15 parts by weight and of group (1) to (5) being determined by the U.V. screening power of said sensitizer-promotor as determined from the refractive index according to the formula:

15 − 17.1 (refractive index minus 1.7) times $\dfrac{\text{(thickness of article in thousandths of an inch)}}{0.020}$;

said sensitizer-promoter having a very fine particle size no greater than 3.4µ and sufficiently fine to provide an external surface area no less than 0.7 m.²/gm. of said sensitizer-promoter, and—for members of the groups (1) to (5) having a refractive index greater than 1.564—sufficiently fine so that the surface area of the sensitizer-promoter particles is at least equal to $A = 10^{2.44 \text{ (refractive index minus 1.564)}}$ m.²/gm.;

and wherein said article is essentially U.V. transparent and has a maximum thickness of about 80 mils.

2. An article in accordance with Claim 1 wherein said particle size is no greater than about 1µ to provide a surface area of at least 2.5 m.²/gm.

3. An article in accordance with Claim 2 wherein said resin contains at least 85% propylene.

4. An article in accordance with Claim 1 wherein said particle size is such to provide a surface of at least 100 m.²/gm.

5. An article in accordance with Claim 2 wherein said additive is silica, calcium carbonate, ground diatomaceous earth, fine clay, precipitated calcium silicate, magnesium oxide, aluminum oxide, or antimony oxide.

6. An article in accordance with Claim 1 wherein said additive is of colloidal size and is aluminum stearate, aluminum octoate or aluminum oleate.

References Cited

UNITED STATES PATENTS

| | | | |
|---|---|---|---|
| 2,959,563 | 11/1960 | Haehn et al. | 260—45.7 R |
| 3,012,003 | 12/1961 | Speyer | 260—45.7 R |
| 3,254,041 | 5/1966 | DePierri | 260—45.7 R |
| 3,367,903 | 2/1968 | Deis et al. | 260—45.7 R |
| 3,576,784 | 4/1971 | Gloor | 260—45.7 R |
| 3,639,518 | 2/1972 | Davies et al. | 260—45.7 R |
| 3,345,352 | 10/1967 | Baron et al. | 260—Dig. 43 |
| 3,590,528 | 7/1971 | Shepherd | 260—Dig. 43 |
| 3,647,111 | 3/1972 | Stager et al. | 260—Dig. 43 |
| 3,454,510 | 7/1969 | Newland et al. | 260—23 |

OTHER REFERENCES

Autoxidation and Autoxidants, Vol. II, by Lündberg, Interscience Pub., N.Y., 1964, p. 686–680.

Mechanisms of Oxidation of Organic Compounds, by Emeleus et al., Methuen & Co., London, 1964, p. 13–14.

Polyethylene by Raff et al., Interscience Pub., N.Y., 1956, p. 403–404.

Macromolecules, Vol. 2, No. 4, p. 364–366, 1969.

DONALD E. CZAJA, Primary Examiner

E. C. RZUCIDLO, Assistant Examiner

U.S. Cl. X.R.

220—dig. 30; 260— 41 R, 41 A, 41 B, 80.78, 88.2 S. 94.9 GC, dig. 43